United States Patent

[11] 3,591,726

[72] Inventors Nils Herbert Edstrom
Friherregatan;
Goran Anders Henrik Hemdal,
Bollmoravagen, both of, Sweden
[21] Appl. No. 770,511
[22] Filed Oct. 25, 1968
[45] Patented July 6, 1971
[73] Assignee Telefonaktiebolaget L M Ericsson
Stockholm, Sweden
[32] Priority Nov. 23, 1967
[33] Sweden
[31] 16110/67

[54] METHOD OF TRANSLATION BETWEEN A SUBSCRIBER DIRECTORY NUMBER AND A SUBSCRIBER EQUIPMENT NUMBER IN A TELECOMMUNICATION SYSTEM
4 Claims, 2 Drawing Figs.

[52] U.S. Cl. ........ 179/18 ET
[51] Int. Cl. ........ H04q 3/47
[50] Field of Search ........ 179/18 TR; 340/347

[56] References Cited

UNITED STATES PATENTS 3,235,664 2/1966 Muroga et al. ........ 179/18 (TR)
2,897,282 7/1959 Hopkins ........ 179/18 (TR)

*Primary Examiner*—Kathleen H. Claffy
*Assistant Examiner*—Thomas W. Brown
*Attorney*—Hane & Baxley

ABSTRACT: A method is disclosed for translations between a subscriber directory number consisting of a number of digits and a subscriber equipment number in a telecommunication equipment. There is a plurality of digit store cells for storing all possible digits which can occur in the different digit positions. The digit store cells with the lowest digit positions are directly associated to the subscriber equipment numbers. Address conversion cells each associated with a digit store cell contain a sum of two addresses, the address of a digit in the next higher digit position and the address of a digit in the next lower digit position. Upon translation in a first direction from the subscriber directory number to the subscriber equipment number a logical operation is carried out between the sum and the first address in order to obtain the address of the digit in the next lower digit position and upon translation in a second direction from the subscriber equipment number to the subscriber directory number a logical operation is carried out between the sum and the second address in order to obtain the address of the digit in the next higher digit position. Upon translation in the first direction a comparison of the digits in the first direction a comparison of the digits in the subscriber directory number is carried out with said digits in said digit store cells so as to find the address conversion cells and upon translation in the second direction a subscriber number digit is indicated which is found in the respective digit store cell whose address is obtained by the logical operation.

Figure 1:
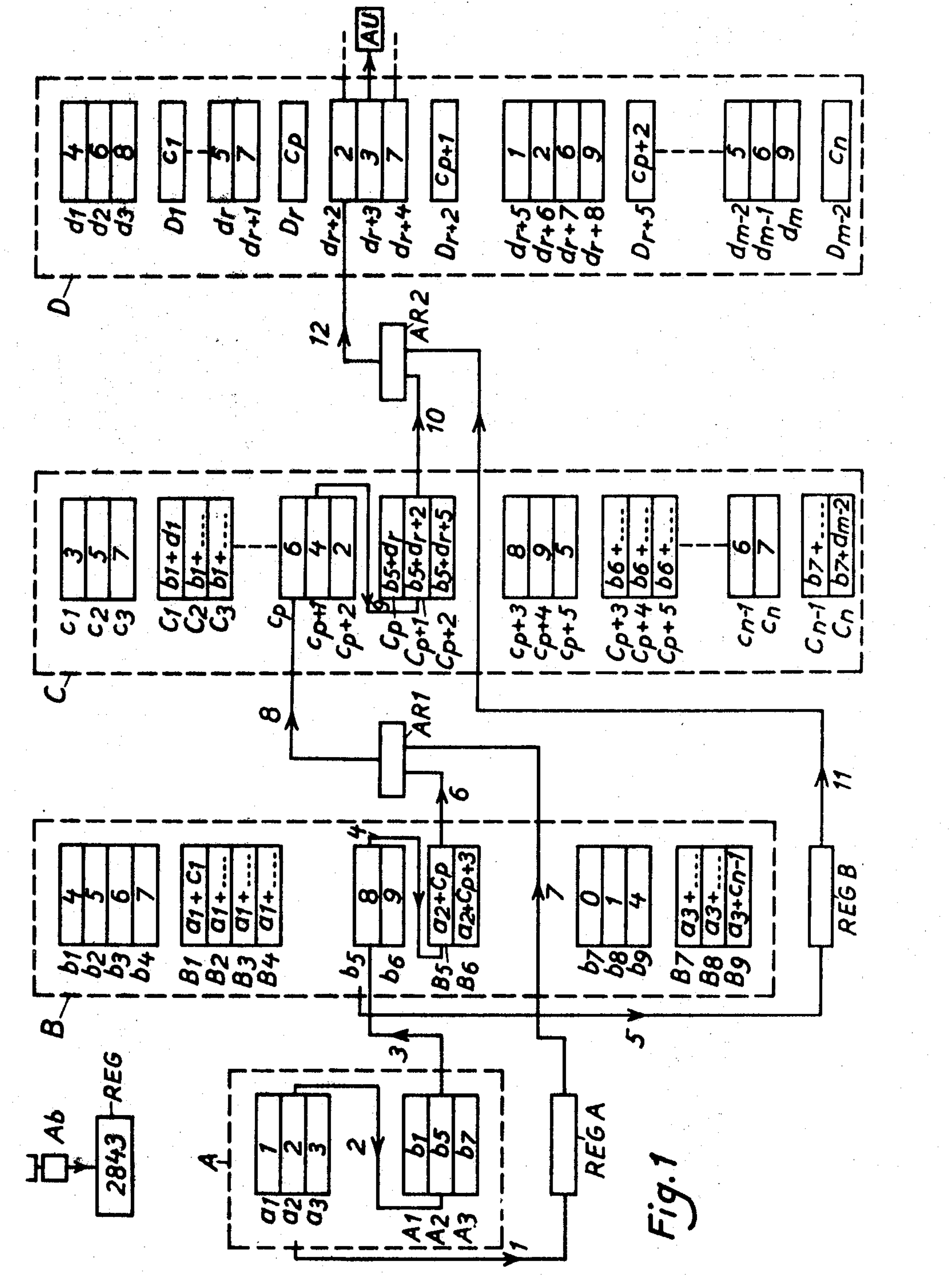

INVENTORS
NILS HERBERT EDSTRÖM
GÖRAN ANDERS HENRIK HEMDAL

INVENTORS
NILS HERBERT EDSTRÖM
GÖRAN ANDERS HENRIK HEMDAL

METHOD OF TRANSLATION BETWEEN A SUBSCRIBER DIRECTORY NUMBER AND A SUBSCRIBER EQUIPMENT NUMBER IN A TELECOMMUNICATION SYSTEM

The present invention relates to a telecommunication equipment comprising a number of subscribers' connections, each with its particular directory number, and a corresponding number of subscribers' equipments, each with its particular exchange number.

In a telecommunication equipment, for example a telephone exchange, it is necessary that one should be able to carry out a conversion from a subscriber's directory number, i.e. the number stated in for example a telephone directory, to the number of the subscriber's equipment in the exchange, the so called exchange number, and vice versa. There is no arithmetic relation between them and it is thus not possible to calculate in a simple way one number from the other one. In a program store controlled telephone exchange this conversion has up to now been carried out so that in one store there is an address list, where the exchange numbers constitute addresses and where at each address the directory number corresponding to the exchange number is registered in the store. Hereby the conversion from exchange to directory numbers will be very fast while on the other hand the conversion in the reverse direction will be much slower, as the address contents must then be searched through until the directory number in question is found, whereafter its address can be read. At each such conversion it will thus be necessary to search through, on the average, half the address list. In order to reduce this conversion time another address list can be introduced into the store in which address list the directory numbers constitute addresses and at these addresses the exchange numbers corresponding to the directory numbers are registered. Such a list will however be very long, as, if the number of digits in the directory number is K, the exchange can receive any of $10^K$ numbers, while the number of exchange numbers is usually considerably smaller. The address list must however also comprise directory numbers which do not correspond to exchange numbers in the exchange, since at these addresses information, indicating that the number does not belong to the exchange in question, is registered.

The first one of the described methods will thus cause a long conversion time for a conversion in one direction, while the other method will require a great store and consequently be very expensive. An object of the present invention is to provide a method according to which it is possible to carry out a conversion between exchange and directory numbers and vice versa, whereby the conversion times in both cases will be of the same order of magnitude as in the last mentioned one of the two known methods described above, while the required storage capacity will be considerably smaller. The characteristics of the invention will appear from the claims following the detailed description.

Figure 2:
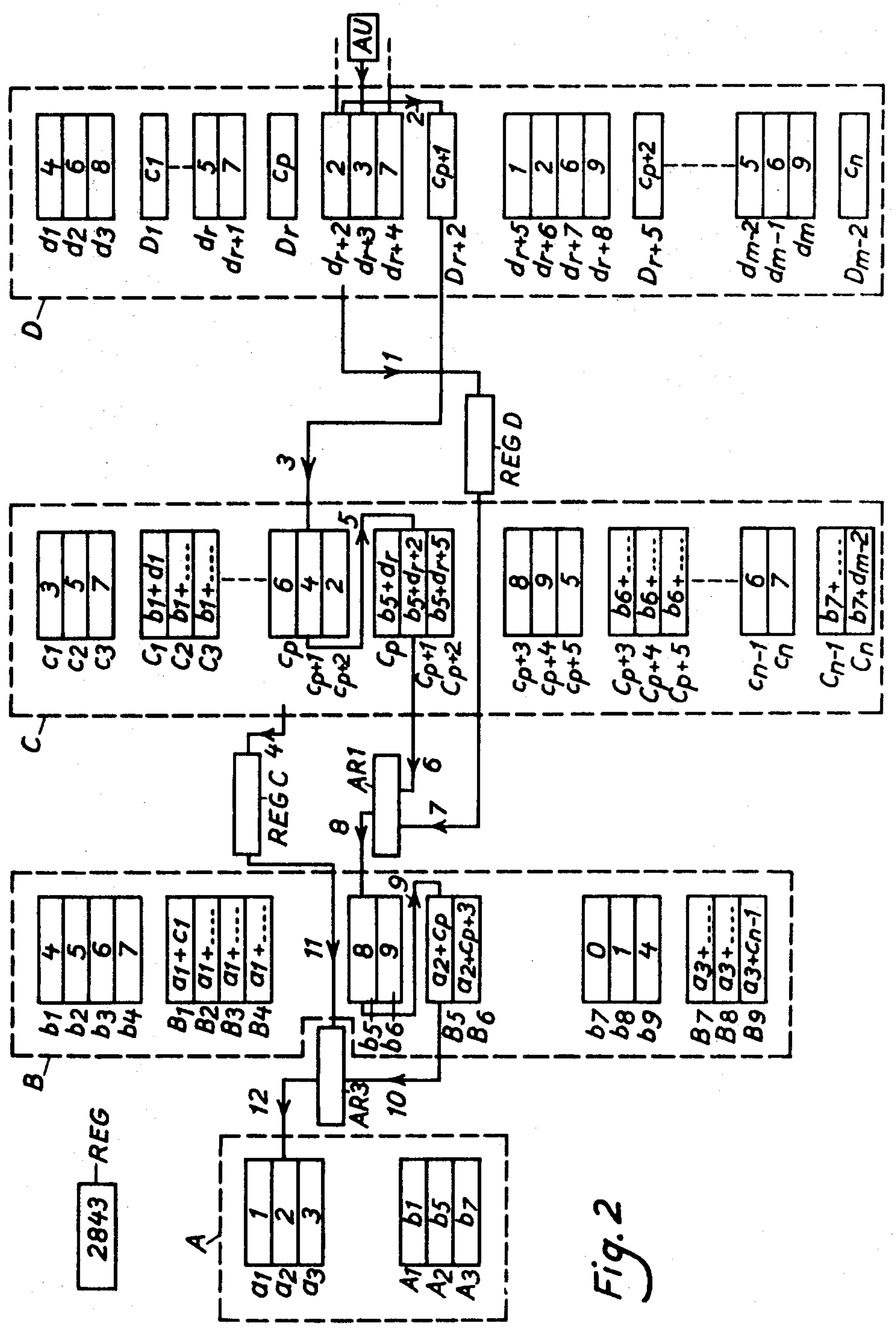

The invention will be more fully described below with reference to the accompanying drawing, in which FIG. 1 and FIG. 2 show an example of how the store space required for the conversion is disposed, and FIG. 1 furthermore comprises a flow diagram which indicates a conversion from directory to exchange numbers and FIG. 2 comprises a flow diagram which indicates a conversion from exchange to directory numbers.

Although the method of the invention can be performed with many process control computers used in telephone switching systems, a specific computer is shown and described in U.S. Pat. No. 3,492,446 which is assigned to the same assignee. In said patent the data store for the present invention and in particular its translation field and registers REG, are parts of the data memory DM of either or both computers shown in FIG. 3 of said patent.

In FIG. 1 there is shown how the store space is disposed when using the method according to the invention for conversion of a four-digit directory number to an exchange number and vice versa. The store words are arranged in four columns A, B, C and D, each corresponding to a digit position in the directory number. The word addresses are stated to the left of the respective rectangle and the information registered in the word is stated in the rectangle. The conversion from directory to exchange numbers is carried out in such a way, that each directory number digit modifies an address within the column belonging to the digit and an address in the succeeding column, dependent upon the value of this digit, is addressed. The conversion can be explained most simply in connection with an example, according to which it is presumed that the directory number 2843 has been received in a register REG from a subscriber A*b*. According to the method, a comparison is first carried out between the first digit 2 of the number and the content of a number of addresses $a_1$, $a_2$ and $a_3$ in column A. At these addresses the digits 1, 2 and 3 are registered, which according to the example are presumed to be the only initial digits in the directory number that correspond to exchange numbers. An equality is found when comparing digit 2 with the content of $a_2$, whereby the comparisons are interrupted. If on the other hand no equality has been found after three comparisons this implies that the conversion is interrupted and an indication is obtained that the directory number does not correspond to any exchange number. In order to decide after which address such an interruption is to take place one can for example introduce a bit in a certain position at each address which bit changes its value in the address following after the last address, the content of which is to be compared with the directory number digit. When equality has been found at the address $a_2$ this address is supplied to a register REG A and an address $A_2$ associated with the address $a_2$ is addressed, which has been indicated by means of the arrows 1 and 2. The address $b_5$ belonging to the column B is registered at the address $A_2$ and this address is addressed (arrow 3). In a corresponding way an equality at the addresses $a_1$ and $a_3$ would have implied that at first the addresses $A_1$ and $A_3$ respectively and then the addresses $b_1$ and $b_7$ respectively would have been addressed. At the address $b_5$ obtained according to the example a comparison process is started which is analogous to the process in column A, whereby the comparison processes are carried out by means of the second digit 8 of the directory number. It has been presupposed that after the initial digit 2 only the digits 8 and 9 can give directory numbers related to exchange numbers in the exchange. As this comparison gives an equality already when comparing the content of the address $b_5$ the comparison process is interrupted at this address and an address $B_5$, associated with the address $b_5$, is addressed. The address $b_5$ is supplied to a register REG B which has been indicated by the arrows 4 and 5. If on the other hand the second digit of the directory number had been 9, the address $b_6$ would, analogous to the process in column A, have been supplied to REG B and the address $B_6$ would have been addressed. Whereas if some other digit had been obtained the conversion would have been interrupted. The information $A_2+c_p$ at the address $B_5$ is then supplied to an arithmetic unit AB 1 which also receives the content of the register REG A (arrows 6 and 7). In the arithmetic unit, $a_2$ is subtracted from $a_2+c_p$ and the resulting address $c_p$ is addressed (arrow 8). After this, a comparison process is started at the address $c_p$ between the content of said address and succeeding addresses and the third digit 4 of the directory number analogous to previous comparison processes. This comparison is interrupted at the address $c_{p+1}$, at which the digit 4 is registered, whereby the address $C_{p+1}$ is selected (arrow 9) and the content $b_5+d_{(r+2)}$ at this address is supplied to an arithmetic unit AR 2 which can in reality be the same as unit AR 1 (arrow 10). Also the content of the register REG B (arrow 11) is supplied to the arithmetic unit which content is subtracted from $b_5+d_{(r+2)}$ and the resulting address $d_{(r+2)}$ is addressed (arrow 12). Then a comparison is started between the content of the address $d_{(r+2)}$ to $d_{(r+4)}$ and the last digit 3 of the directory number. And the conversion is interrupted at the comparison at the address $d_{(r+3)}$, where 3 is registered. An address univocally corresponding to the directory number has thus been obtained, which is used for indicating a device, for example a subscriber's equipment AU, that has an exchange number corresponding to the directory number. In reality the number of possible digits in each digit position in the directory is of course larger but there is always the advantage, that the conversion is interrupted as soon as the examined digits indicate that no exchange number corresponding to the directory number can be obtained in the exchange.

In FIG. 2, which shows the same part of the store as FIG. 1, and where the store words have the same references, a flow diagram is indicated showing how, from the address $d_{(r+3)}$, which has been picked out by a call to a subscriber's equipment AU, the directory number 2843 corresponding to said address is obtained. This is carried out in the following way: At first the digit 3 at the address $d_{(r+3)}$ is read, digit 3 constituting the last one of the directory number. After this a number is subtracted from the address, this number being such that the first address in the comparison process in this digit position is obtained at the conversion from directory to exchange numbers, i.e. in this case the number 1. This number may for example apart from the digit 3 be registered at the address $d_{(r+3)}$. The address $d_{(r+2)}$ obtained after the subtraction is then supplied to a register REG D and an address $D_{(r+2)}$, associated with the address $d_{(r+2)}$, is addressed which has been indicated by the arrows 1 and 2. The address $c_{p+1}$ is registered in the address $D_{(r+2)}$ and in the next operation this address will be addressed (arrow 3). From the address $c_{p+1}$ the second last digit 4 of the directory number is read and then the address $c_p$, which is the first one in the comparison process in this digit position at the conversion from directory to exchange numbers, is calculated in the same way as in stage D and this address is supplied to a register REG C (arrow 4). Thereafter the address $C_{(p+1)}$, belonging to the address $c_{(p+1)}$, is addressed analogous to the process at the conversion from directory to exchange numbers and the content of this address $b_5+d_{(r+2)}$ is together with the content in the register REG D supplied to the arithmetic unit AR 1 (arrows 6 and 7). In the arithmetic unit a subtraction is carried out and the address $b_5$, obtained as the subtraction result, is addressed (arrow 8). From this address the second digit 8 of the directory number is read, whereafter, according to the process in FIG. 1, the address $B_5$ is addressed (arrow 9). The content of this address is then, together with the content in the register REG C, supplied to an arithmetic unit AR 3 (arrows 10 and 11). In unit AR 3 the content $c_p$ of the register REG C is subtracted from the content $a_2+c_p$ in $B_5$, whereby the address $a_2$ is obtained and addressed (arrow 12). At this address is the first digit of the directory number, the reading of which is the final operation. In this way all the digits in the directory number have been obtained.

Several modifications can of course be made within the scope of the invention. Thus $B_5$ and $C_{p+1}$ may constitute the result of an "exclusive or" operation between the addresses, instead of a total of two addresses, whereby instead of a subtraction an "exclusive-or" operation between the addresses, instead of a total of two addresses, whereby instead of a subtraction an "exclusive-or" operation is carried out in the arithmetic units, which is realized by the following example. If in the address $B_5$ $a_2 \oplus c_p$ is registered, where $\oplus$ denotes the operation "exclusive-or," $(a_2 \oplus c_p) \ominus a_2 =_p$ is obtained as a result from the arithmetic unit AR 1 in FIG. 1 and $(a_2 \oplus c_p) \oplus c_p = < v\alpha_2$ is obtained from the unit AR 3 in FIG. 2.

Furthermore the number of addresses listed in the comparison operation in each stage can be stated and this number stored in a separate special address. Then the comparison processes can be interrupted when their number exceeds that number stored in the separate special register.

The described method can moreover be used for so called abbreviated dialing. If, for example, the subscriber with the directory number 2843 according to the example above wishes to call the directory number 2826, he can do this by first indicating that he is intending to dial a two digit directory number. This implies that the conversion from an exchange to a directory number is stopped at the address $b_5$, whereafter when the exchange has received the digits a conversion from a directory to an exchange number takes place, starting from the address $b_5$ according to the principle illustrated in FIG. 1, whereby the address $d_{(r+7)}$ is picked out.

We claim:

1. A method for translating a subscriber directory number consisting of a plurality of digits to a subscriber equipment number in a telecommunication equipment comprising the steps of:

storing in addressable and readable digit store cells one digit of the possible digits in the highest digit position of the subscriber directory number and one digit of the possible digits of the remaining digit positions of a subscriber directory number containing at least said one digit in the highest digit position, respectively, said digit store cells being arranged in tree-structure groups defined by said subscriber directory number so that each digit cell is superordinated to a group, except for those digit store cells containing a digit of the lowest digit position in the subscriber directory number, said latter digit store cells being directly associated with a respective subscriber equipment number;

storing in address conversion cells each associated with one of said digit store cells the sum of a first and a second operand, said first operand being the address of the digit store cell superordinated to the respective digit store cell group and said second operand being the address of the first digit store cell in that group to which the digit store cell associated with the address conversion cell in question is superordinated except for the digit store cells directly associated with a respective subscriber equipment number, of which to a whole group a single address conversion cell is associated containing only said first operand except for the digit store cells containing the digits of the highest digit position having associated address conversion cells containing only said second operand;

performing successive comparisons between the digits of the subscriber directory number and the contents of the digit store cells in the groups defined by the respective subscriber directory number part, beginning with the highest digit position, when finding equality selecting the address conversion cell associated with said digit store cell except for said digit store cells directly associated with a respective subscriber equipment number, performing a first logical operation between the contents of only those address conversion cells having first and second operands and the respective first operand whereby the address defined by said second operand is selected.

2. A method for translating a subscriber equipment number consisting of a plurality of digits to a subscriber directory number having a plurality of digits in a telecommunication equipment comprising the steps of:

storing in addressable and readable digit store cells one digit of the possible digits in the highest digit position of the subscriber directory number and one digit of the possible digits of the remaining digit positions of a subscriber directory number containing at least said one digit in the highest digit position, respectively, said digit store cells being arranged in tree-structure groups defined by said subscriber directory number so that each digit cell is superordinated to a group, except for the digit store cells containing a digit of the lowest digit position in the subscriber directory number, said latter digit store cells being directly associated with a respective subscriber equipment number, the contents of the digit store cells directly associated with a respective subscriber equipment number directly indicating the digit in the lowest digit position of the subscriber directory number;

storing in address conversion cells each associated with one of said digit store cells the sum of a first and a second operand, said first operand being the address of the digit store cell superordinated to the respective digit store cell group and said second operand being the address of the first digit store cell in that group to which the digit store cell associated with the address conversion cell in question is superordinated except for the digit store cells directly associated with a respective subscriber equipment number, of which to a whole group a single address conversion cell is associated containing only said first operand except for the digit store cells containing the digit of the highest digit position having associated address conversion cells containing only said second operand;

selecting by means of the address conversion cell associated with the respective group of digit store cells directly associated with a subscriber equipment number the address of the superordinated digit store cell;

selecting the address conversion cell associated with the selected digit store cell;

performing a logical operation between the contents of the address conversion cell and the respective second operand so that the address of the next superordinated digit store cell is selected; and repeating said selecting and logical operation steps until the digit store cell has been reached which contains the digit of the highest digit position, each time a digit store cell is selected its contents defining a digit of the subscriber directory number.

3. The method of claim 1 wherein said logical operation is an addition.

4. In telecommunication equipment, apparatus for translating between subscriber, directory numbers and subscriber equipment numbers characterized in that a plurality of addressable and readable store cells are arranged in main groups (A, B, C, D), each corresponding to a digit position in a subscriber directory number, whereby the positional significance of the main groups corresponds to the positional significance of the digit positions in the subscriber directory number starting from the most significant digit of the subscriber directory number and that the store cells in each main group form subgroups (*a*1...*a*3 A1...A3; *b*1...*b*4 B1...B4; *b*5*b*6 B5B6; and so on), and that together the subgroups form a tree structure in such a way that a number of subgroups in the next less significant main group are associated with each subgroup in a main group, whereby a portion of each subgroup consists of digit store cells (*a*1...*a*3, *b*1...*b*4, *b*5*b*6 and so on) storing digits which in combination with the digits in the more significant main groups can lead to a directory number corresponding to an equipment number, each digit store cell in the least significant main group corresponding to a definite exchange number, another portion of each subgroup consisting of a number of address conversion cells (A1...A3, B1...B4, B5B6 and so on), associated with the digit store cells, each address conversion storing the result from a first logical operation between the address of the digit store cell in the subgroup of the next more significant main group associated with said subgroup and the address of the first digit store cell in next least significant main group associated with the subgroup, devices (REG A, REG B and so on), for comparison of each digit in the directory number with the digits in the digit store cells in a subgroup determined by all the more significant digits in the directory number in accordance with the tree structure, means under control of said comparison devices, when equality has been found, for registering the address of the digit store cell where the equality has been found and the addresses of the address conversion cell associated with said digit store cell, and devices (AR 1, AB 2 and so on) for carrying out, at a conversion from directory to equipment numbers, a second logical operation between the contents in the address conversion cell and the address of the digit store cell in the next more significant main group that corresponds to the more significant digit of the directory number and for carrying out, at a conversion from equipment to directory numbers, a second logical operation between the contents of the address conversion cell of a selected main group and the address of the first digit store cell in the next less significant main group associated with said address conversion cell, and for carrying out, at the last mentioned conversion, the registering of the results of the logical operation in the respective digit store cell when the logical operation within each group is carried out.